(12) United States Patent
Suto et al.

(10) Patent No.: US 10,902,869 B2
(45) Date of Patent: Jan. 26, 2021

(54) MAGNETIC HEAD HAVING A MAGNETIC LAYER AND FIRST AND SECOND CONDUCTIVE LAYERS PROVIDED BETWEEN A SHIELD AND A MAGNETIC POLE AND MAGNETIC RECORDING AND REPRODUCING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suto, Ota Tokyo (JP); Naoyuki Narita, Funabashi Chiba (JP); Tazumi Nagasawa, Yokohama Kanagawa (JP); Masayuki Takagishi, Kunitachi Tokyo (JP); Tomoyuki Maeda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/552,009

(22) Filed: Aug. 27, 2019

(65) Prior Publication Data
US 2020/0168244 A1 May 28, 2020

(30) Foreign Application Priority Data

Nov. 22, 2018 (JP) .................................. 2018-219270

(51) Int. Cl.
*G11B 5/31* (2006.01)
*G11B 5/23* (2006.01)
(Continued)

(52) U.S. Cl.
CPC ............ *G11B 5/315* (2013.01); *G11B 5/1278* (2013.01); *G11B 5/23* (2013.01); *G11B 5/2455* (2013.01);
(Continued)

(58) Field of Classification Search
CPC ....... G11B 5/1278; G11B 5/23; G11B 5/2455; G11B 5/3146
(Continued)

(56) References Cited

U.S. PATENT DOCUMENTS 6,493,183 B1 * 12/2002 Kasiraj .................. G11B 5/127
360/125.44
9,130,055 B1 * 9/2015 Braganca ............... G11B 5/398
(Continued)

FOREIGN PATENT DOCUMENTS

| JP | 2018-147540 A | 9/2018 |
| JP | 2019-57338 A | 4/2019 |

*Primary Examiner* — Jefferson A Evans
(74) *Attorney, Agent, or Firm* — Finnegan, Henderson, Farabow, Garrett & Dunner, L.L.P.

(57) ABSTRACT

According to one embodiment, a magnetic head includes a magnetic pole, a first shield, a magnetic layer, and first and second conductive layers. The magnetic layer is provided between the magnetic pole and the first shield. The first conductive layer contacts the first shield and the magnetic layer, is provided between the first shield and the magnetic layer, and includes at least one element selected from Cu, Ag, and Au. The second conductive layer is provided between the magnetic pole and the magnetic layer. The second conductive layer includes first and second regions. The first region contacts the magnetic layer and includes at least one first element selected from Cu, Ag, Au, Al, Ti, Ru, Mg, and V. The second region is provided between the first region and the magnetic pole and includes at least one second element selected from Ta, Pt, W, Mo, Ir, Cr, Tb, Rh, and Pd. This arrangement allows the magnetic field emitted
(Continued)

from the magnetic pole to be oriented efficiently towards the magnetic recording medium and recording density to be increased.

20 Claims, 5 Drawing Sheets

(51) Int. Cl.
  *G11B 5/127* (2006.01)
  *G11B 5/245* (2006.01)
(52) U.S. Cl.
  CPC .......... *G11B 5/3116* (2013.01); *G11B 5/3146* (2013.01); *G11B 5/3153* (2013.01)
(58) Field of Classification Search
  USPC .............................. 360/119.03, 119.04, 125.3
  See application file for complete search history.

(56) References Cited

U.S. PATENT DOCUMENTS

| | | | |
|---|---|---|---|
| 10,679,650 B2* | 6/2020 | Bai | G11B 5/23 |
| 10,714,136 B1* | 7/2020 | Chen | G11B 5/3133 |
| 2017/0186450 A1* | 6/2017 | Yamada | G11B 5/3146 |
| 2018/0261241 A1* | 9/2018 | Narita | G11B 5/315 |
| 2019/0088275 A1* | 3/2019 | Narita | G11B 5/3116 |
| 2019/0251992 A1* | 8/2019 | Ho | G11B 5/23 |
| 2019/0259412 A1* | 8/2019 | Gao | G11B 5/315 |
| 2019/0267029 A1* | 8/2019 | Bai | G11B 5/235 |
| 2019/0279668 A1* | 9/2019 | Freitag | G11B 5/1278 |
| 2020/0058322 A1* | 2/2020 | Narita | G11B 5/1278 |
| 2020/0082845 A1* | 3/2020 | Suto | G11B 5/3143 |
| 2020/0090685 A1* | 3/2020 | Takagishi | G11B 5/66 |
| 2020/0176022 A1* | 6/2020 | Li | G11B 5/21 |

* cited by examiner

MAGNETIC HEAD HAVING A MAGNETIC LAYER AND FIRST AND SECOND CONDUCTIVE LAYERS PROVIDED BETWEEN A SHIELD AND A MAGNETIC POLE AND MAGNETIC RECORDING AND REPRODUCING DEVICE

CROSS-REFERENCE TO RELATED APPLICATIONS

This application is based upon and claims the benefit of priority from Japanese Patent Application No. 2018-219270, filed on Nov. 22, 2018; the entire contents of which are incorporated herein by reference.

FIELD

Embodiments described herein relate generally to a magnetic head and a magnetic recording and reproducing device.

BACKGROUND

Information is recorded in a magnetic storage medium such as a HDD (Hard Disk Drive) or the like by using a magnetic head. It is desirable to increase the recording density of the magnetic head and the magnetic recording and reproducing device.

DETAILED DESCRIPTION

Figure 1A:
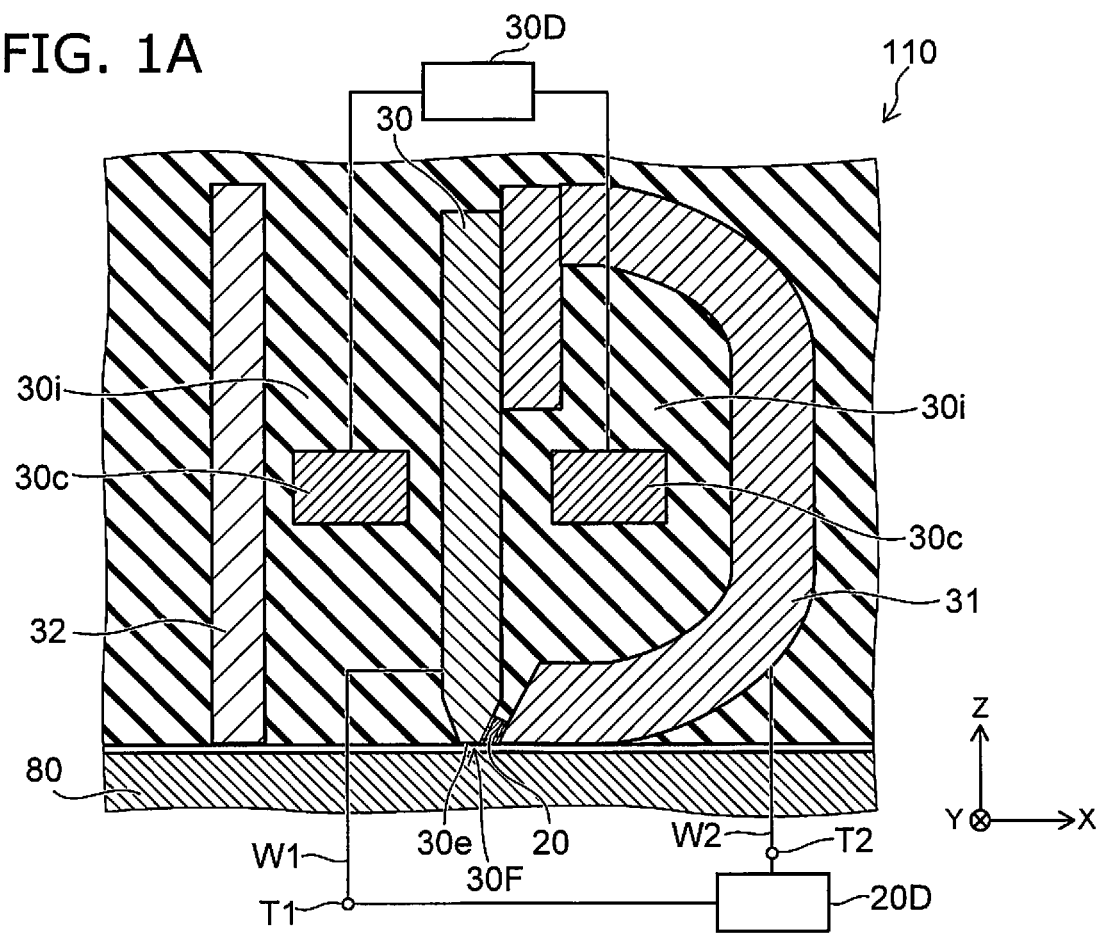
FIG. 1A and FIG. 1B are schematic cross-sectional views illustrating a magnetic head according to a first embodiment.

According to one embodiment, a magnetic head includes a magnetic pole, a first shield, a magnetic layer, a first conductive layer, and a second conductive layer. The magnetic layer is provided between the magnetic pole and the first shield. The first conductive layer contacts the first shield and the magnetic layer, is provided between the first shield and the magnetic layer, and includes at least one selected from the group consisting of Cu, Ag, and Au. The second conductive layer is provided between the magnetic pole and the magnetic layer. The second conductive layer includes a first region and a second region. The first region contacts the magnetic layer and includes at least one first element selected from the group consisting of Cu, Ag, Au, Al, Ti, Ru, Mg, and V. The second region is provided between the first region and the magnetic pole and includes at least one second element selected from the group consisting of Ta, Pt, W, Mo, Ir, Cr, Tb, Rh, and Pd.

According to another embodiment, a magnetic head includes a magnetic pole, a first shield, a magnetic layer, a first conductive layer, and a second conductive layer. The magnetic layer is provided between the magnetic pole and the first shield. The first conductive layer contacts the magnetic pole and the magnetic layer, is provided between the magnetic pole and the magnetic layer, and includes at least one selected from the group consisting of Cu, Ag, and Au. The second conductive layer is provided between the first shield and the magnetic layer. The second conductive layer includes a first region and a second region. The first region contacts the magnetic layer and includes at least one first element selected from the group consisting of Cu, Ag, Au, Al, Ti, Ru, Mg, and V. The second region is provided between the first region and the first shield and includes at least one second element selected from the group consisting of Ta, Pt, W, Mo, Ir, Cr, Tb, Rh, and Pd.

According to another embodiment, a magnetic recording and reproducing device includes the magnetic head described in any one of the above, a magnetic recording medium, and a first electrical circuit. Information is recorded in the magnetic recording medium by the magnetic head. The first electrical circuit is configured to supply a current between the magnetic pole and the first shield.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
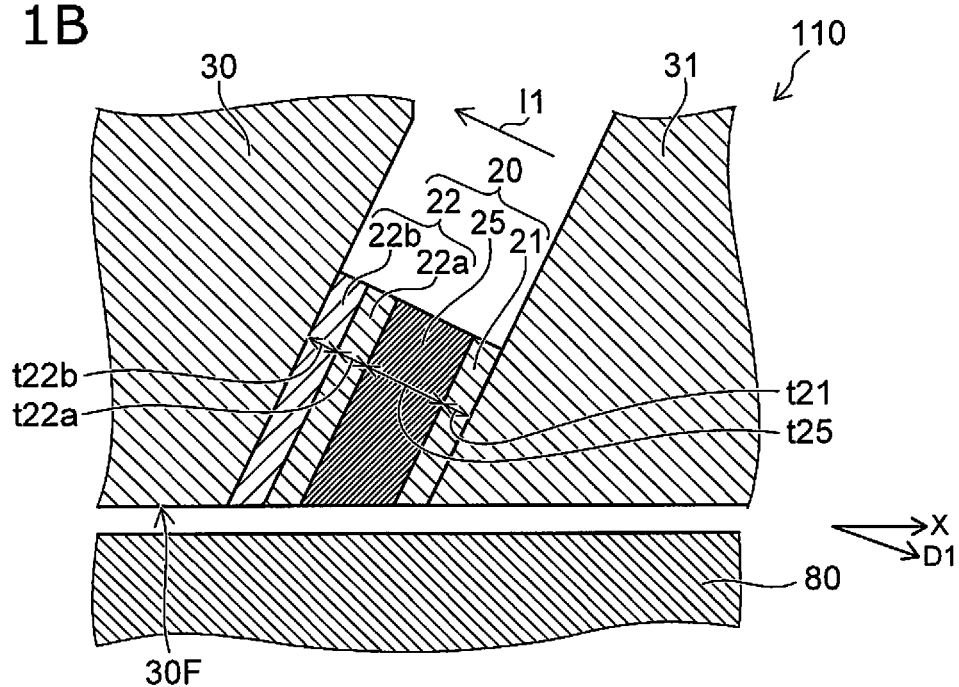

FIG. 1A and FIG. 1B are schematic cross-sectional views illustrating a magnetic head according to a first embodiment.

FIG. 1B is an enlarged view of a portion of FIG. 1A.

As shown in FIG. 1A, the magnetic head 110 according to the embodiment includes a magnetic pole 30, a first shield 31, and a stacked body 20. A second shield 32 and a coil 30c are further provided in the example.

The magnetic pole 30 is positioned between the first shield 31 and the second shield 32. For example, at least a portion of the coil 30c is positioned between the magnetic pole 30 and the first shield 31. In the example, a portion of the coil 30c is positioned between the magnetic pole 30 and the second shield 32.

A recording electrical circuit (a second electrical circuit 30D) is electrically connected to the coil 30c. A recording current is supplied from the recording electrical circuit to the coil 30c. A magnetic field (a recording magnetic field) that corresponds to the recording current is generated from the magnetic pole 30. The recording magnetic field is applied to a magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

As shown in FIG. 1B, the stacked body 20 includes a magnetic layer 25, a first conductive layer 21, and a second conductive layer 22. The magnetic layer 25 is provided between the magnetic pole 30 and the first shield 31.

The first conductive layer 21 is provided between the first shield 31 and the magnetic layer 25. The first conductive layer 21 contacts the first shield 31 and the magnetic layer 25. The second conductive layer 22 is provided between the magnetic pole 30 and the magnetic layer 25.

As shown in FIG. 1A, for example, an insulating portion 30$i$ is provided around the magnetic pole 30, the first shield 31, the second shield 32, the coil 30$c$, the magnetic layer 25, the first conductive layer 21, and the second conductive layer 22. The insulating portion 30$i$ is not illustrated in FIG. 1B.

The magnetic pole 30 is, for example, a major magnetic pole. A magnetic pole surface 30F is provided at an end portion 30$e$ of the magnetic pole 30. For example, the magnetic pole surface 30F is aligned with the ABS (Air Bearing Surface) of the magnetic head 110. The magnetic pole surface 30F opposes the magnetic recording medium 80.

A direction perpendicular to the magnetic pole surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is the cross-track direction.

For example, the magnetic pole 30 is separated from the first shield 31 along the X-axis direction at the vicinity of the magnetic pole surface 30F. For example, the second shield 32 is separated from the magnetic pole 30 along the X-axis direction at the vicinity of the magnetic pole surface 30F. The magnetic head 110 and the magnetic recording medium 80 move relative to each other substantially along the X-axis direction. Thereby, the information is recorded at any position of the magnetic recording medium 80.

For example, the first shield 31 corresponds to a "trailing shield." For example, the second shield 32 corresponds to a "leading shield." The first shield 31 is, for example, an auxiliary magnetic pole. The first shield 31 can form a magnetic core with the magnetic pole 30. For example, an additional shield such as a side shield (not illustrated), etc., may be provided.

As shown in FIG. 1B, a first current I1 flows in the first conductive layer 21 and the second conductive layer 22. In the example shown in FIG. 1B, the first current I1 has an orientation from the first shield 31 toward the magnetic pole 30. The first current I1 has an orientation from the first conductive layer 21 toward the second conductive layer 22.

For example, the first conductive layer 21 may be electrically connected to the first shield 31. The second conductive layer 22 may be electrically connected to the magnetic pole 30. In such a case, the first current I1 recited above may be supplied via the magnetic pole 30 and the first shield 31.

As shown in FIG. 1A, a first wire W1 and a second wire W2 may be provided. The first wire W1 is electrically connected to the magnetic pole 30. The second wire W2 is electrically connected to the first shield 31. A first terminal T1 and a second terminal T2 may be provided. The first terminal T1 is electrically connected to the magnetic pole 30 via the first wire W1. The second terminal T2 is electrically connected to the first shield 31 via the second wire W2.

For example, the first current I1 recited above is supplied from a first electrical circuit 20D (referring to FIG. 1A). For example, the first current I1 can be supplied from the first electrical circuit 20D to the magnetic pole 30 and the first shield 31 via the first terminal T1, the first wire W1, the second wire W2, and the second terminal T2.

In the embodiment, because the first current I1 flows in the stacked body 20, the magnetic field that is emitted from the magnetic pole 30 can be oriented efficiently toward the magnetic recording medium 80. It is considered that this is because the orientation of the magnetization of the magnetic layer 25 reverses with respect to the magnetic field emitted from the magnetic pole 30 due to the first current I1; as a result, the magnetic field that is emitted from the magnetic pole 30 does not pass through the magnetic layer 25 easily and is oriented more easily toward the magnetic recording medium 80.

In the embodiment, the first conductive layer 21 includes, for example, at least one selected from the group consisting of Cu, Ag, and Au.

The second conductive layer 22 includes a first region 22$a$ and a second region 22$b$. The first region 22$a$ contacts the magnetic layer 25. The first region 22$a$ includes, for example, at least one first element selected from the group consisting of Cu, Ag, Au, Al, Ti, Ru, Mg, and V. The second region 22$b$ is provided between the first region 22$a$ and the magnetic pole 30. The second region 22$b$ includes, for example, at least one second element selected from the group consisting of Ta, Pt, W, Mo, Ir, Cr, Tb, Rh, and Pd. In the example, the second region 22$b$ contacts the first region 22$a$ and the magnetic pole 30.

By such a configuration, the current at which the orientation of the magnetization of the magnetic layer 25 reverses with respect to the magnetic field emitted from the magnetic pole 30 can be reduced. The orientation of the magnetization of the magnetic layer 25 is reversed by a small first current I1; and the magnetic field that is emitted from the magnetic pole 30 is oriented efficiently toward the magnetic recording medium 80. Thereby, for example, the recording density can be increased. Thereby, for example, the reliability of the magnetic recording device increases.

An example of operations and characteristics of the magnetic head 110 will now be described.

Figure 2:
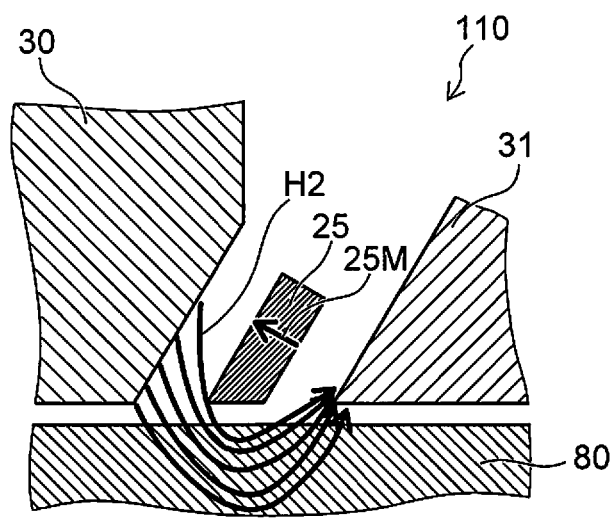
FIG. 2 is a schematic cross-sectional view illustrating an operation of the magnetic head according to the first embodiment.

FIG. 2 is a schematic cross-sectional view illustrating an operation of the magnetic head according to the first embodiment.

In FIG. 2, the magnetic pole 30, the first shield 31, and the magnetic layer 25 are illustrated; and the other members (the first conductive layer 21, the second conductive layer 22, etc.) are not illustrated.

The magnetic layer 25 has a magnetization 25M. A magnetic field H2 (a recording magnetic field) is generated from the magnetic pole 30. At least a portion of the magnetic field H2 is used as a recording magnetic field. When the magnetization 25M of the magnetic layer 25 is not reversed as recited above, the magnetic field H2 enters the magnetic layer 25. On the other hand, when the first current I1 is supplied and the orientation of the magnetization 25M of the magnetic layer 25 is reversed with respect to the magnetic field H2 as shown in FIG. 2, the magnetic field H2 is not oriented easily toward the magnetic layer 25. Thereby, much of the magnetic field H2 is oriented toward the magnetic recording medium 80. Much of the magnetic field H2 passes through the magnetic recording medium 80 as a recording magnetic field and enters the first shield 31. Therefore, much of the magnetic field H2 (the recording magnetic field) is applied easily to the magnetic recording medium 80. Even when the write gap is reduced, the magnetic field H2 is applied effectively to the magnetic recording medium 80.

In the embodiment, even when the write gap is reduced, the orientation of the magnetic field H2 emitted from the magnetic pole 30 toward the first shield 31 directly via the magnetic layer 25 is suppressed. As a result, much of the magnetic field H2 emitted from the magnetic pole 30 is oriented toward the magnetic recording medium 80; and the recording magnetic field is applied effectively to the magnetic recording medium 80. The recording density can be increased thereby.

Figure 3:
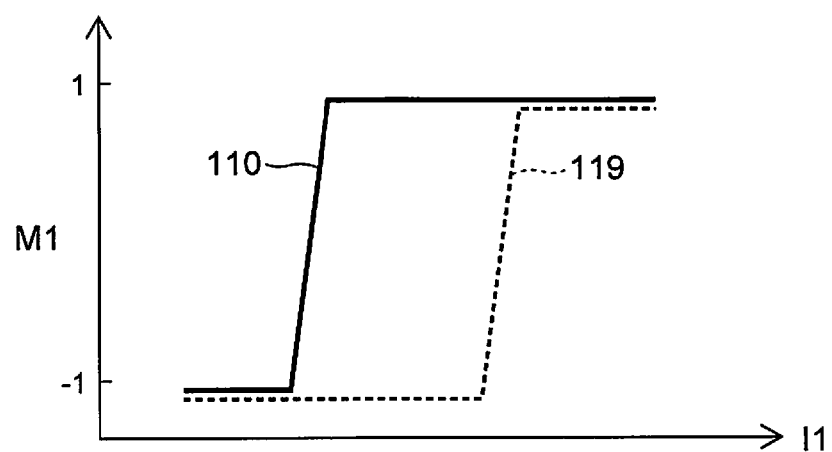
FIG. 3 is a graph illustrating characteristics of magnetic heads.

FIG. 3 is a graph illustrating characteristics of magnetic heads.

The horizontal axis of FIG. 3 is the magnitude of the first current I1. The vertical axis of FIG. 3 is an orientation M1 of the magnetization 25M of the magnetic layer 25. For example, in the initial state, the orientation M1 is the orientation of "−1." The orientation M1 becomes "1" when the orientation M1 reverses.

In FIG. 3, an example of a characteristic of a magnetic head 119 of a reference example is shown in addition to an example of a characteristic of the magnetic head 110 according to the embodiment. In the second conductive layer 22 of the magnetic head 119, only the second region 22b is provided; and the first region 22a is not provided. In the magnetic head 119, the second region 22b contacts the magnetic layer 25.

As shown in FIG. 3, the orientation M1 of the magnetization 25M of the magnetic layer 25 reverses as the first current I1 increases. As shown in FIG. 3, the current at which the reversal occurs in the magnetic head 110 is smaller than the current at which the reversal occurs in the magnetic head 119.

Thus, because the second conductive layer 22 includes the first region 22a, the current at which the orientation M1 of the magnetization 25M reverses can be reduced.

The second element that is included in the second region 22b includes at least one selected from the group consisting of Ta, Pt, W, Mo, Ir, Cr, Tb, Rh, and Pd. The spin diffusion length of such a second element is short. It is considered that the damping constant of the magnetic layer 25 becomes large in the case where a layer including such a second element contacts the magnetic layer 25. Or, it is considered that a large damping constant is maintained. Therefore, a large current is necessary to reverse the magnetization 25M.

Conversely, in the embodiment, the first region 22a is inserted between the magnetic layer 25 and the second region 22b. The first element that is included in the first region 22a includes at least one selected from the group consisting of Cu, Ag, Au, Al, Ti, Ru, Mg, and V. For example, the spin diffusion length of such a first element is long. It is considered that the damping constant of the magnetic layer 25 becomes small in the case where a region including such a first element contacts the magnetic layer 25. Or, it is considered that a small damping constant is maintained. Therefore, the magnetization 25M can be reversed by a small current.

In the embodiment, the reversal of the magnetization 25M of the magnetic layer 25 is obtained efficiently. The magnetic field that is emitted from the magnetic pole 30 is oriented efficiently toward the magnetic recording medium 80 by a small current. The recording density increases. Because the current is small, the heat generation, etc., can be suppressed. The characteristics of the magnetic head are stabilized. High reliability is obtained easily.

In one example according to the embodiment, the first region 22a does not include the second element. Or, the concentration of the second element in the first region 22a is lower than the concentration of the second element in the second region 22b.

In one example according to the embodiment, the second region 22b does not include the first element. Or, the concentration of the first element in the second region 22b is lower than the concentration of the first element in the first region 22a.

In one example according to the embodiment, the first region 22a and the second region 22b have layer configurations. In the embodiment, a distinct boundary between these regions may not be observed. An intermediate region between the first region 22a and the second region 22b may be observed.

For example, a portion of the first region 22a at the second region 22b side may include the second element. A portion of the second region 22b at the first region 22a side may include the first element.

The concentration of the second element in the second conductive layer 22 may decrease in the orientation from the second region 22b toward the first region 22a. The concentration of the first element in the second conductive layer 22 may decrease in the orientation from the first region 22a toward the second region 22b.

In the embodiment, the first conductive layer 21 may include multiple stacked films. The multiple stacked films each include at least one selected from the group consisting of Cu, Ag, and Au.

In the embodiment, the first region 22a may include multiple stacked films. The multiple stacked films each include at least one first element selected from the group consisting of Cu, Ag, Au, Al, Ti, Ru, Mg, and V.

In the embodiment, the second region 22b may include multiple stacked films. The multiple stacked films each include at least one second element selected from the group consisting of Ta, Pt, W, Mo, Ir, Cr, Tb, Rh, and Pd.

As shown in FIG. 1B, a direction along the direction from the magnetic layer 25 toward the first conductive layer 21 is taken as a first direction D1. For example, the first direction D1 is parallel to the direction from the magnetic layer 25 toward the first conductive layer 21. The first direction D1 corresponds to the stacking direction of the stacked body 20.

A thickness t21 of the first conductive layer 21 in the first direction D1 is, for example, not less than 1 nm and not more than 10 nm. Thereby, for example, the magnetic coupling of the first shield 31 and the magnetic layer 25 can be broken. For example, spin can be injected efficiently from the first shield 31 into the magnetic layer 25.

A thickness t22a of the first region 22a in the first direction D1 is, for example, not less than 1 nm and not more than 10 nm. Thereby, for example, the increase of the damping of the magnetic layer 25 due to the effects of the second region 22b can be suppressed.

A thickness t22b of the second region 22b in the first direction D1 is, for example, not less than 1 nm and not more than 10 nm. Thereby, for example, the magnetic coupling of the magnetic pole 30 and the magnetic layer 25 can be broken. For example, the spin injection from the magnetic pole 30 into the magnetic layer 25 can be suppressed.

A thickness t25 of the magnetic layer 25 in the first direction D1 is, for example, not less than 3 nm and not more than 30 nm. Thereby, for example, the magnetization direction of the magnetic layer 25 can be reversed by the first current I1 having a magnitude that is not problematic for the reliability of the recording head. For example, a magnetic field that is effective for increasing the recording density can be generated from the magnetic layer 25.

The magnetic layer 25 includes, for example, Fe and Co. In such a case, the composition of Fe in the magnetic layer 25 is, for example, not less than 50 atm % and not more than 95 atm %. By such a material, for example, the damping of the magnetic layer 25 can be reduced.

The magnetic layer 25 may include Fe and Ni. In such a case, the composition of Fe in the magnetic layer 25 is, for example, not less than 10 atm % and not more than 30 atm %. By using such a material, for example, the magnetic layer 25 can be a soft magnetic body having a small magnetocrystalline anisotropy and a small induced magnetic anisotropy.

As recited above, the magnetization 25M of the magnetic layer 25 is reversed by the first current IL By the reversal of the magnetization 25M of the magnetic layer 25, the electrical resistance of the stacked structure including the magnetic pole 30, the stacked body 20, and the first shield 31 may change.

For example, the case where the magnetic layer 25 is electrically connected to the magnetic pole 30 and the first shield 31 is as follows. The electrical resistance when the recording current flows in the coil 30c and a current flows from the magnetic pole 30 toward the first shield 31 may be different from the electrical resistance when the recording current flows in the coil 30c and a current flows from the first shield 31 toward the magnetic pole 30. Information that relates to the existence or absence of the reversal of the magnetization 25M may be obtained using the electrical resistance difference. For example, the electrical resistance when the recording current flows in the coil 30c and the first current I1 flows from the magnetic pole 30 toward the first shield 31 may be different from the electrical resistance when the recording current flows in the coil 30c and a current smaller than the first current I1 flows between the first shield 31 and the magnetic pole 30.

As described above in the first embodiment, the second region 22b is provided between the first region 22a and the magnetic pole 30. In the example of FIG. 1B, the second region 22b contacts the first region 22a and contacts the magnetic pole 30. In another example according to the first embodiment, another region may be provided between the first region 22a and the magnetic pole 30. The other region includes at least one of the first element or the second element. For example, a configuration of the magnetic pole 30/other first region 22a/second region 22b/first region 22a/magnetic pole 25 may be provided. For example, a configuration of the magnetic pole 30/other second region 22b/other first region 22a/second region 22b/first region 22a/magnetic pole 25 may be provided. In such a case as well, at least one first region 22a is provided between the second region 22b and the magnetic pole 30. A small damping constant is obtained in the magnetic layer 25; and the magnetization 25M can be reversed by a small current. The recording density can be increased.

For example, the flatness can be improved by increasing the number of films included in the stacked body 20. For example, when forming the magnetic pole surface 30F (the ABS) by polishing, etc., the polishing rate is dependent on the material; as a result, there are cases where an unevenness is formed in the magnetic pole surface 30F. By increasing the number of films included in the stacked body 20, the unevenness in the magnetic pole surface 30F can be suppressed.

Second Embodiment

Figure 4:
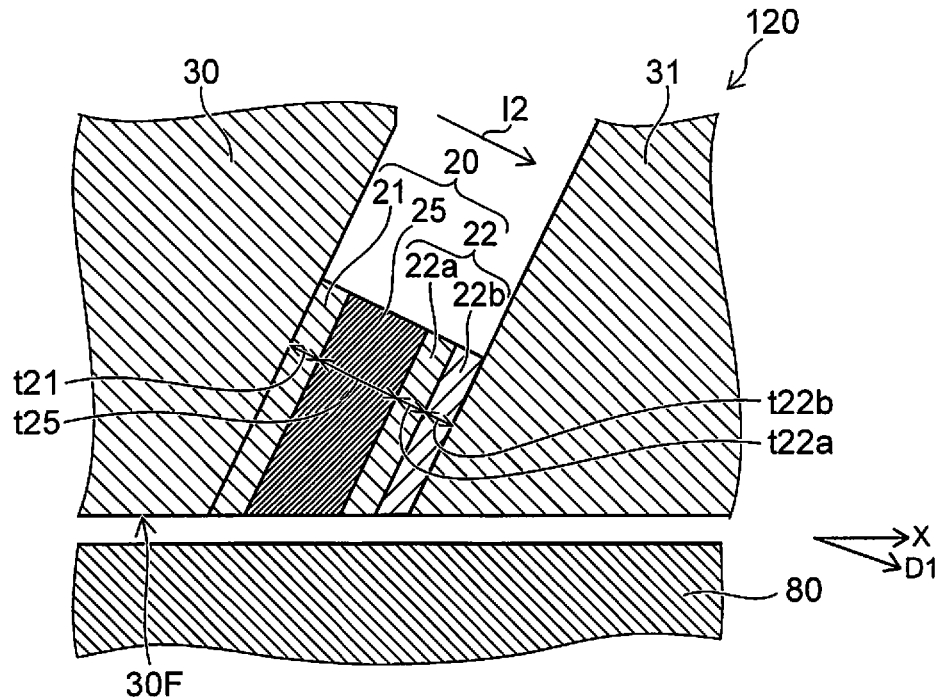
FIG. 4 is a schematic cross-sectional view illustrating a magnetic head according to a second embodiment.

FIG. 4 is a schematic cross-sectional view illustrating a magnetic head according to a second embodiment.

As shown in FIG. 4, the magnetic head 120 according to the embodiment also includes the magnetic pole 30, the first shield 31, and the stacked body 20. The second shield 32 and the coil 30c are further provided in the example as well. The stacked body 20 includes the magnetic layer 25, the first conductive layer 21, and the second conductive layer 22. The positions of the first conductive layer 21 and the second conductive layer 22 in the magnetic head 120 are different from those in the magnetic head 110. Otherwise, the configuration of the magnetic head 120 may be similar to the configuration of the magnetic head 110. An example of the stacked body 20 of the magnetic head 120 will now be described.

In the magnetic head 120, the magnetic layer 25 is provided between the magnetic pole 30 and the first shield 31. The first conductive layer 21 is provided between the magnetic pole 30 and the magnetic layer 25. The first conductive layer 21 contacts the magnetic pole 30 and the magnetic layer 25. The first conductive layer 21 includes at least one selected from the group consisting of Cu, Ag, and Au.

The second conductive layer 22 is provided between the first shield 31 and the magnetic layer 25. The second conductive layer 22 includes the first region 22a and the second region 22b. The first region 22a contacts the magnetic layer 25. The first region 22a includes at least one first element selected from the group consisting of Cu, Ag, Au, Al, Ti, Ru, Mg, and V. The second region 22b is provided between the first region 22a and the first shield 31. The second region 22b includes the second element including at least one selected from the group consisting of Ta, Pt, W, Mo, Ir, Cr, Tb, Rh, and Pd. In the example, the second region 22b contacts the first region 22a and the first shield 31.

In the magnetic head 120, a second current I2 flows from the magnetic pole 30 toward the first shield 31. The magnetization 25M of the magnetic layer 25 is reversed with respect to the magnetic field emitted from the magnetic pole 30 by the second current I2.

In the magnetic head 120 having such a configuration as well, the reversal of the magnetization 25M of the magnetic layer 25 is obtained efficiently. The magnetic field that is emitted from the magnetic pole 30 is oriented efficiently toward the magnetic recording medium 80 by a small current. The recording density increases. Because the current is small, the heat generation, etc., can be suppressed. The characteristics of the magnetic head are stabilized. High reliability is obtained easily.

The configurations described in reference to the magnetic head 110 are applicable to the magnetic layer 25, the first conductive layer 21, the first region 22a, and the second region 22b of the magnetic head 120.

In the second embodiment as described above, the second region 22b is provided between the first region 22a and the first shield 31. In the example of FIG. 4, the second region 22b contacts the first region 22a and contacts the first shield 31. In another example according to the second embodiment, another region may be provided between the first region 22a and the first shield 31. The other region includes at least one of the first element or the second element. For example, a configuration of the magnetic pole 25/first region 22a/second region 22b/other first region 22a/first shield 31 may be provided. For example, a configuration of the magnetic layer 25/first region 22a/other second region 22b/other first region 22a/second region 22b/first shield 31 may be provided. In such a case as well, at least one first region 22a is provided between the second region 22b and the magnetic pole 30. A small damping constant is obtained in the magnetic layer 25; and the magnetization 25M can be reversed by a small current. The recording density can be increased.

For example, the flatness can be improved by increasing the number of films included in the stacked body 20. For example, the unevenness in the magnetic pole surface 30F caused by the polishing rate difference due to the materials can be suppressed.

Third Embodiment

A third embodiment relates to a magnetic memory device. The magnetic memory device according to the embodiment includes a magnetic head, the magnetic recording medium 80 (e.g., a recording medium disk 180 described below), and the first electrical circuit 20D (referring to FIG. 1A). Information is recorded in the magnetic recording medium by the magnetic head (the magnetic pole 30). Any magnetic head according to the first embodiment or the second embodiment and the magnetic heads of the modifications may be used as the magnetic head of the third embodiment. A case will now be described where the magnetic head 110 is used.

As described above, the first electrical circuit 20D is configured to supply a current (the first current I1 or the second current I2) between the magnetic pole 30 and the first shield 31. The magnetic memory device according to the embodiment may further include the second electrical circuit 30D (referring to FIG. 1A). As described above, the second electrical circuit 30D is configured to supply, to the coil 30c, a current (a recording current) corresponding to the information to be recorded in the magnetic recording medium 80.

The magnetic head 110 may perform shingled recording to the magnetic recording medium 80. The recording density can be increased further.

An example of a magnetic recording and reproducing device according to the embodiment will now be described.

Figure 5:
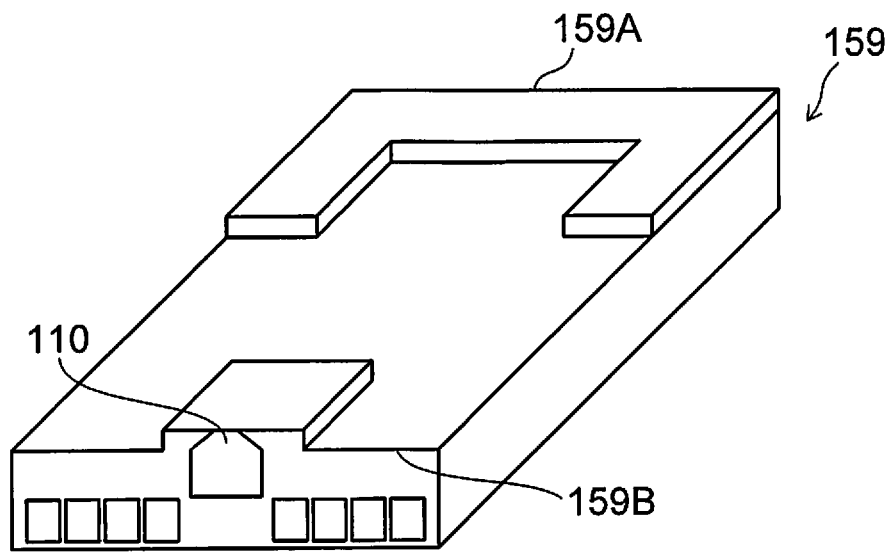
FIG. 5 is a schematic perspective view illustrating a portion of the magnetic recording and reproducing device according to the embodiment.

FIG. 5 is a schematic perspective view illustrating a portion of the magnetic recording and reproducing device according to the embodiment.

FIG. 5 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 6:
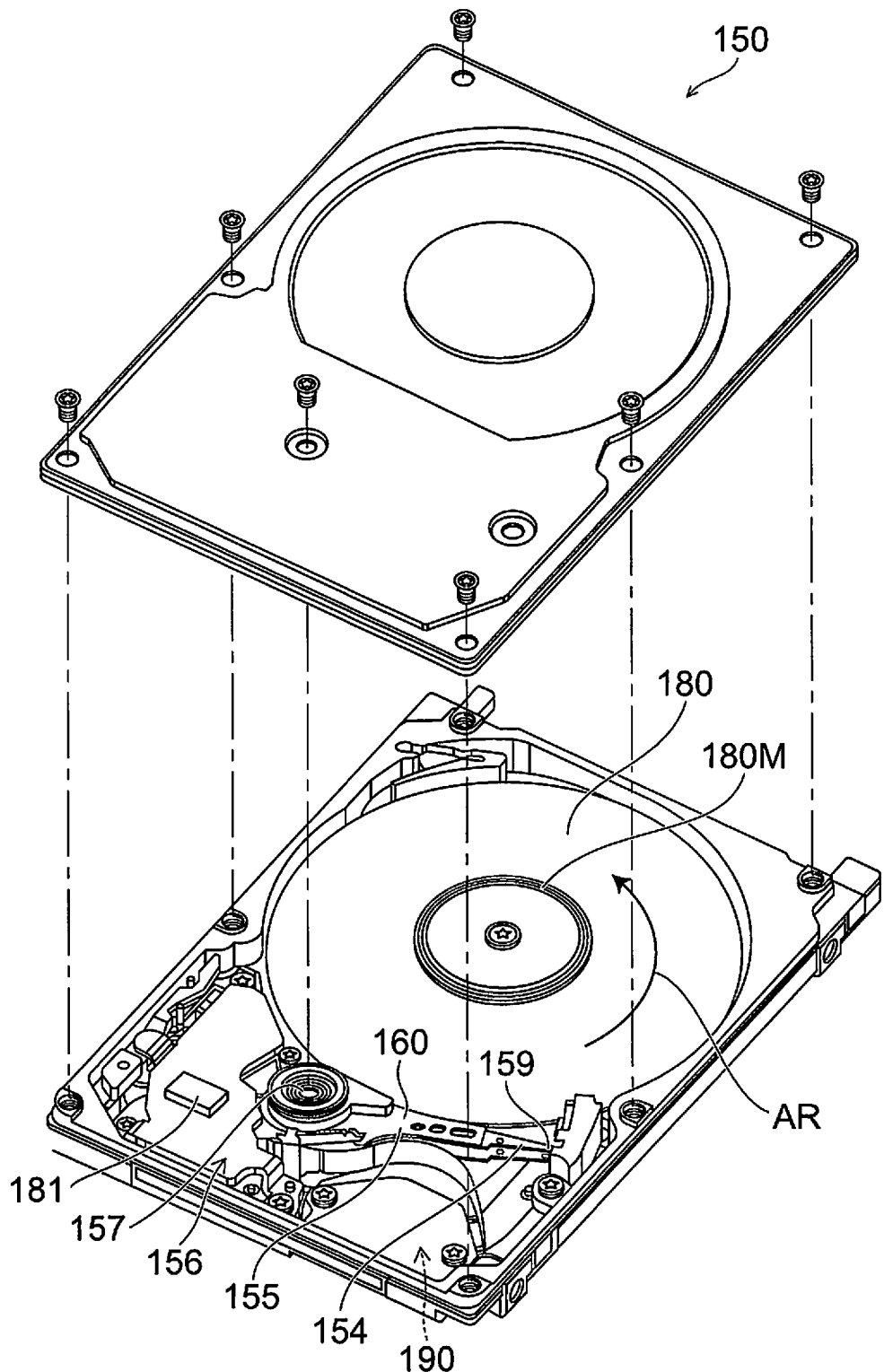
FIG. 6 is a schematic perspective view illustrating the magnetic recording and reproducing device according to the embodiment.

FIG. 6 is a schematic perspective view illustrating the magnetic recording and reproducing device according to the embodiment.

As shown in FIG. 6, a rotary actuator is used in the magnetic recording and reproducing device 150 according to the embodiment. The recording medium disk 180 is provided in a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 7A:
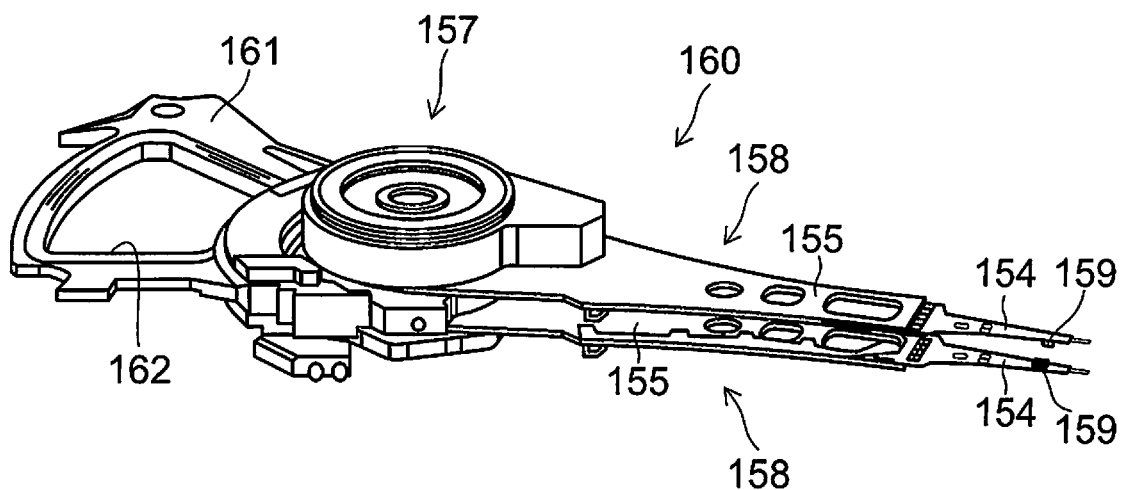
FIG. 7A and FIG. 7B are schematic perspective views illustrating a portion of the magnetic recording and reproducing device according to the embodiment.
Figure 7B:
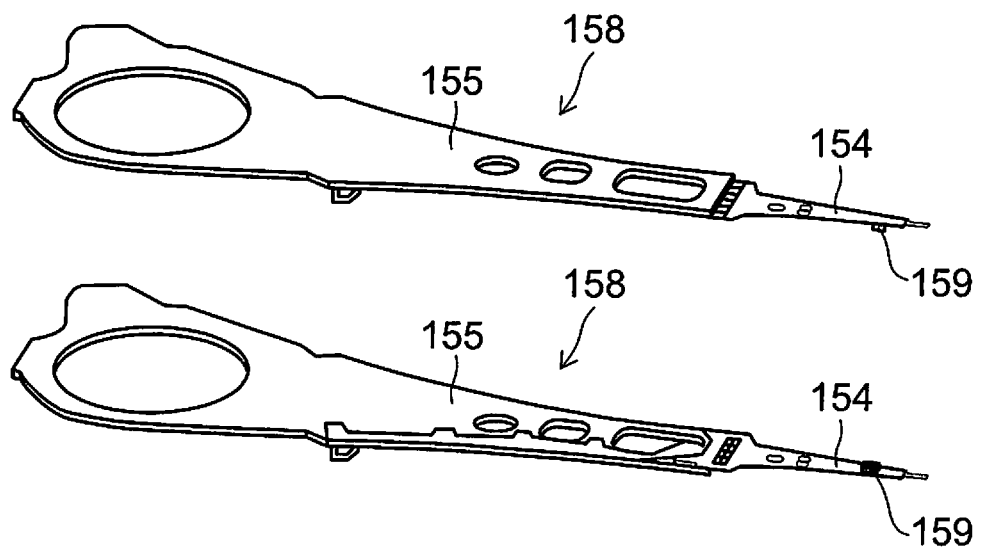

FIG. 7A and FIG. 7B are schematic perspective views illustrating a portion of the magnetic recording and reproducing device according to the embodiment.

FIG. 7A illustrates the configuration of a portion of the magnetic recording and reproducing device and is an enlarged perspective view of a head stack assembly 160. FIG. 7B is a perspective view illustrating a magnetic head assembly (a head gimbal assembly (HGA)) 158 that is a portion of the head stack assembly 160.

As shown in FIG. 7A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 7B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using the magnetic head provided in the magnetic head assembly.

The embodiments may include the following configurations (e.g., technological proposals).

Configuration 1
  A magnetic head, comprising:
  a magnetic pole;
  a first shield;
  a magnetic layer provided between the magnetic pole and the first shield;
  a first conductive layer contacting the first shield and the magnetic layer, being provided between the first shield and the magnetic layer, and including at least one selected from the group consisting of Cu, Ag, and Au; and
  a second conductive layer provided between the magnetic pole and the magnetic layer, the second conductive layer including a first region and a second region, the first region contacting the magnetic layer and including at least one first element selected from the group consisting of Cu, Ag, Au, Al, Ti, Ru, Mg, and V, the second region being provided between the first region and the magnetic pole and including at least one second element selected from the group consisting of Ta, Pt, W, Mo, Ir, Cr, Tb, Rh, and Pd.

Configuration 2
  The magnetic head according to Configuration 1, wherein a current flows from the first shield toward the magnetic pole.

Configuration 3
  A magnetic head, comprising:
  a magnetic pole;
  a first shield;
  a magnetic layer provided between the magnetic pole and the first shield;
  a first conductive layer contacting the magnetic pole and the magnetic layer, being provided between the magnetic pole and the magnetic layer, and including at least one selected from the group consisting of Cu, Ag, and Au; and
  a second conductive layer provided between the first shield and the magnetic layer, the second conductive layer including a first region and a second region, the first region contacting the magnetic layer and including at least one first element selected from the group consisting of Cu, Ag, Au, Al, Ti, Ru, Mg, and V, the second region being provided between the first region and the first shield and including at least one second element selected from the group consisting of Ta, Pt, W, Mo, Ir, Cr, Tb, Rh, and Pd.

Configuration 4
  The magnetic head according to Configuration 3, wherein a current flows from the magnetic pole toward the first shield.

Configuration 5
  The magnetic head according to any one of Configurations 1 to 4, further comprising:
  a first wire electrically connected to the magnetic pole; and
  a second wire electrically connected to the first shield.

Configuration 6
  The magnetic head according to any one of Configurations 1 to 5, further comprising:
  a first terminal electrically connected to the magnetic pole; and
  a second terminal electrically connected to the first shield.

Configuration 7
  The magnetic head according to any one of Configurations 1 to 6, wherein
  the first region does not include the second element, or
  a concentration of the second element in the first region is lower than a concentration of the second element in the second region.

Configuration 8
  The magnetic head according to any one of Configurations 1 to 7, wherein
  the second region does not include the first element, or
  a concentration of the first element in the second region is lower than a concentration of the first element in the first region.

Configuration 9
  The magnetic head according to any one of Configurations 1 to 6, wherein a portion of the first region at the second region side includes the second element.

Configuration 10
  The magnetic head according to any one of Configurations 1 to 6, wherein a portion of the second region at the first region side includes the first element.

Configuration 11
  The magnetic head according to any one of Configurations 1 to 6, wherein a concentration of the second element in the second conductive layer decreases in an orientation from the second region toward the first region.

Configuration 12

The magnetic head according to any one of Configurations 1 to 6, wherein a concentration of the first element in the second conductive layer decreases in an orientation from the first region toward the second region.

Configuration 13

The magnetic head according to any one of Configurations 1 to 12, wherein a thickness of the first conductive layer in a first direction is not less than 1 nm and not more than 10 nm, the first direction being aligned with a direction from the magnetic layer toward the first conductive layer.

Configuration 14

The magnetic head according to any one of Configurations 1 to 12, wherein a thickness of the first region in a first direction is not less than 1 nm and not more than 10 nm, the first direction being aligned with a direction from the magnetic layer toward the first conductive layer.

Configuration 15

The magnetic head according to any one of Configurations 1 to 12, wherein a thickness of the second region in a first direction is not less than 1 nm and not more than 10 nm, the first direction being aligned with a direction from the magnetic layer toward the first conductive layer.

Configuration 16

The magnetic head according to any one of Configurations 1 to 15, wherein the magnetic layer includes Fe and Co, and a composition of Fe in the magnetic layer is not less than 50 atm % and not more than 95 atm %.

Configuration 17

The magnetic head according to any one of Configurations 1 to 15, wherein the magnetic layer includes Fe and Ni, and a composition of Fe in the magnetic layer is not less than 10 atm % and not more than 30 atm %.

Configuration 18

The magnetic head according to Configuration 1 or 2, wherein the second region contacts the first region and the magnetic pole.

Configuration 19

The magnetic head according to Configuration 3 or 4, wherein the second region contacts the first region and the first shield.

Configuration 20

A magnetic recording and reproducing device, comprising:

the magnetic head according to any one of Configurations 1 to 19;

a magnetic recording medium, information being recorded in the magnetic recording medium by the magnetic head; and a first electrical circuit configured to supply a current between the magnetic pole and the first shield.

Configuration 21

The magnetic recording and reproducing device according to Configuration 20, wherein the magnetic head performs shingled recording to the magnetic recording medium.

Configuration 22

The magnetic recording and reproducing device according to Configuration 20 or 21, further comprising a second electrical circuit, the magnetic head further including a coil, at least a portion of the coil being positioned between the magnetic pole and the first shield, the second electrical circuit being configured to supply, to the coil, a current corresponding to the information.

According to the embodiments, a magnetic head and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, magnetic layers, conductive layers, insulating layers, wirers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:

a magnetic pole;

a first shield;

a magnetic layer provided between the magnetic pole and the first shield;

a first conductive layer contacting the first shield and the magnetic layer, being provided between the first shield and the magnetic layer, and including at least one element selected from the group consisting of Cu, Ag, and Au; and a second conductive layer provided between the magnetic pole and the magnetic layer, the second conductive layer including a first region and a second region, the first region contacting the magnetic layer and including at least one first element selected from the group consisting of Cu, Ag, Au, Al, Ti, Ru, Mg, and V, the second region being provided between the first region and the magnetic pole and including at least one second element selected from the group consisting of Ta, Pt, W, Mo, Ir, Cr, Tb, Rh, and Pd.

2. The head according to claim 1, wherein a current flows from the first shield toward the magnetic pole.

3. The head according to claim 1, further comprising:
a first wire electrically connected to the magnetic pole; and
a second wire electrically connected to the first shield.

4. The head according to claim 1, further comprising:
a first terminal electrically connected to the magnetic pole; and
a second terminal electrically connected to the first shield.

5. The head according to claim 1, wherein
the first region does not include the second element, or
a concentration of the second element in the first region is lower than a concentration of the second element in the second region.

6. The head according to claim 1, wherein
the second region does not include the first element, or
a concentration of the first element in the second region is lower than a concentration of the first element in the first region.

7. The head according to claim 1, wherein a portion of the first region at the second region side includes the second element.

8. The head according to claim 1, wherein a portion of the second region at the first region side includes the first element.

9. The head according to claim 1, wherein a concentration of the second element in the second conductive layer decreases in an orientation from the second region toward the first region.

10. The head according to claim 1, wherein a concentration of the first element in the second conductive layer decreases in an orientation from the first region toward the second region.

11. The head according to claim 1, wherein a thickness of the first conductive layer in a first direction is not less than 1 nm and not more than 10 nm, the first direction being aligned with a direction from the magnetic layer toward the first conductive layer.

12. The head according to claim 1, wherein a thickness of the first region in a first direction is not less than 1 nm and not more than 10 nm, the first direction being aligned with a direction from the magnetic layer toward the first conductive layer.

13. The head according to claim 1, wherein a thickness of the second region in a first direction is not less than 1 nm and not more than 10 nm, the first direction being aligned with a direction from the magnetic layer toward the first conductive layer.

14. The head according to claim 1, wherein
the magnetic layer includes Fe and Co, and
a composition of Fe in the magnetic layer is not less than 50 atm % and not more than 95 atm %.

15. The head according to claim 1, wherein
the magnetic layer includes Fe and Ni, and
a composition of Fe in the magnetic layer is not less than 10 atm % and not more than 30 atm %.

16. The head according to claim 1, wherein the second region contacts the first region and the magnetic pole.

17. A magnetic recording and reproducing device, comprising:
the magnetic head according to claim 1;
a magnetic recording medium, information being recorded in the magnetic recording medium by the magnetic head; and
a first electrical circuit configured to supply a current between the magnetic pole and the first shield.

18. A magnetic head, comprising:
a magnetic pole;
a first shield;
a magnetic layer provided between the magnetic pole and the first shield;
a first conductive layer contacting the magnetic pole and the magnetic layer, being provided between the magnetic pole and the magnetic layer, and including at least one element selected from the group consisting of Cu, Ag, and Au; and
a second conductive layer provided between the first shield and the magnetic layer, the second conductive layer including a first region and a second region, the first region contacting the magnetic layer and including at least one first element selected from the group consisting of Cu, Ag, Au, Al, Ti, Ru, Mg, and V, the second region being provided between the first region and the first shield and including at least one second element selected from the group consisting of Ta, Pt, W, Mo, Ir, Cr, Tb, Rh, and Pd.

19. The head according to claim 18, wherein a current flows from the magnetic pole toward the first shield.

20. The head according to claim 18, wherein the second region contacts the first region and the first shield.

* * * * *